United States Patent
Hailey

(10) Patent No.: US 6,647,052 B2
(45) Date of Patent: Nov. 11, 2003

(54) ADVANCED SPREAD SPECTRUM CLOCK GENERATION TECHNIQUE FOR EMI REDUCTION OF MULTIPLE CLOCK SOURCES

(75) Inventor: Jeffery Charles Hailey, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/036,013

(22) Filed: Dec. 26, 2001

(65) Prior Publication Data

US 2003/0118080 A1 Jun. 26, 2003

(51) Int. Cl.[7] .......................... H04B 15/00; H04K 1/00; H04L 27/30
(52) U.S. Cl. ..................... 375/130; 375/144; 375/148; 375/346
(58) Field of Search ................................. 375/130, 144, 375/148, 346, 131, 354, 370, 376, 140, 141; 713/500, 501, 600, 601

(56) References Cited

U.S. PATENT DOCUMENTS

| | | | | | |
|---|---|---|---|---|---|
| 5,943,382 A | * | 8/1999 | Li et al. | ...................... | 375/375 |
| 6,240,123 B1 | * | 5/2001 | Zhang et al. | ............... | 375/130 |
| 6,404,834 B1 | * | 6/2002 | Hardin et al. | ............... | 327/105 |

* cited by examiner

*Primary Examiner*—William A. Luther
(74) *Attorney, Agent, or Firm*—Hamilton & Terrile, LLP; Robert W. Holland

(57) ABSTRACT

The present invention describes a method and apparatus for reducing EMI emission in a multi source electronic system. The phase of the modulated waveform is varied to minimize the number of clocks within the EMI measurement bandwidth. The phase of the modulated waveform is varied in proportion to the number of EMI generating sources in the electronic system. The spread-spectrum clock is used as reference for phase delay of the modulated waveform. The phase delay can be predetermined or dynamically programmed according to the number of the EMI sources in the electronic system.

21 Claims, 5 Drawing Sheets

US 6,647,052 B2

ADVANCED SPREAD SPECTRUM CLOCK GENERATION TECHNIQUE FOR EMI REDUCTION OF MULTIPLE CLOCK SOURCES

BACKGROUND OF THE INVENTION

1. Field of the Invention

This invention relates to the field of spread-spectrum clock circuits, specifically to spread-spectrum clock circuits used to reduce Electro Magnetic Interference (EMI) in electronic systems.

2. Description of the Related Art

Spread Spectrum Clocking ("SSC") is used to spread the EMI energy of a system across a wide bandwidth. The spread of EMI energy reduces the overall EMI emission of the system. In SSC, the stable clock source of the system is frequency modulated which causes the frequency to deviate (e.g., between 0.25% and 5%). SSC design is used for EMI compliance of the system.

During compliance testing of computing systems, EMI is measured with a receiver with a fixed bandwidth, usually 120 KHz. When two or more emission sources lie within this bandwidth, the emission from each source is added linearly. For example, if two separate emission sources of equal amplitude are separated by less than 120 KHz in frequency, the receiver detects a signal that is twice the amplitude (e.g., 6 dB greater) than that of either source.

Generally, complex computing systems includes multiple emission sources (e.g., a rack of servers or the like). When multiple systems are measured, the base frequency of each system can fall within the receiver's bandwidth (e.g., 120 KHz). If a single frequency is generated by each emission source within the system, the combined emission can be the sum of all the emission generated by each source. Thus, a computing system with multiple emission sources can fail the over compliance test. Therefore, a method and apparatus is needed to reduce EMI emission from multiple sources within a system.

SUMMARY

In one embodiment of the present invention, a method of reducing electromagnetic interference in a system is described. The method includes generating a spread-spectrum master clock, generating a plurality of phase-offset spread-spectrum slave clocks from the spread-spectrum master clock and using the plurality of phase-offset spread-spectrum slave clocks for at least one electromagnetic interference source. Each one of the phase-offset spread-spectrum slave clocks has a different phase-offset. The different phase-offsets are generated using a phase delays. In one embodiment, the phase delays are predetermined. In another embodiment, the phase delays are dynamically calculated.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention, which is defined in the claims following the description.

Introduction

The present invention describes a method and apparatus for reducing EMI emission in a multi source electronic system. The phase of the modulated waveform is varied to minimize the number of clocks within the EMI measurement bandwidth. The phase of the modulated waveform is varied in proportion to the number of EMI generating sources in the electronic system. The spread-spectrum clock is used as reference for phase delay of the modulated waveform. The phase delay can be predetermined or dynamically programmed according to the number of the EMI sources in the electronic system.

System Architecture

Figure 1A:
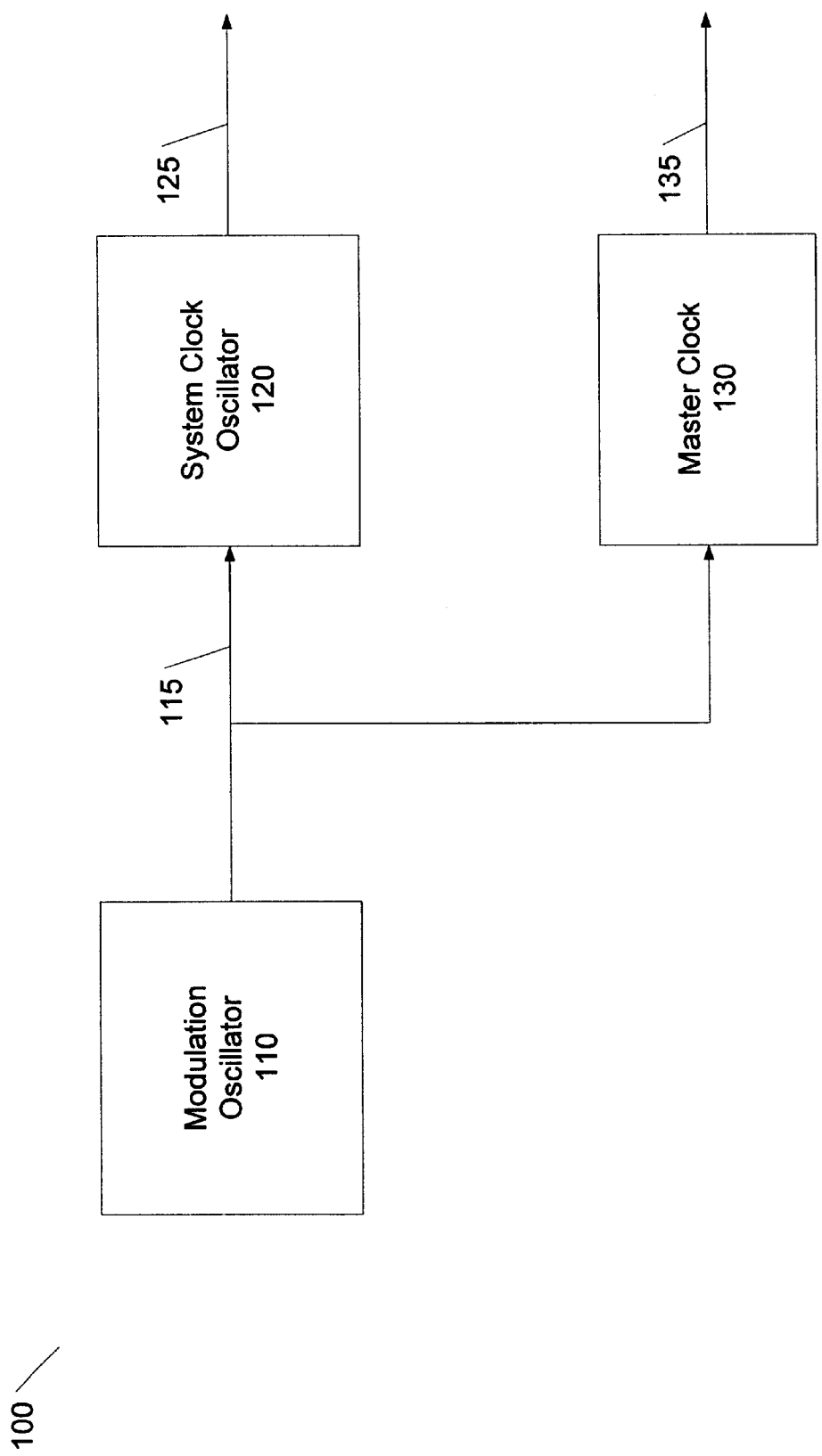
FIG. 1A illustrates an example of a master spread-spectrum clock generation system according to an embodiment of the present invention.

FIG. 1A illustrates an example of a master spread-spectrum clock generation system according to an embodiment of the present invention. A modulation oscillator 110 is the waveform modulator providing modulation waveform for spread-spectrum clock generation. Modulation oscillator 110 is coupled via link 115 to a system clock oscillator 120. System clock oscillator 120 generates modulated spread-spectrum clock for the electronic system. The modulated spread-spectrum clock generated by system clock oscillator 120 can be used as master clock for the electronic system (e.g., initial clock in the back frame of an electronic system, clock for the first server in a rack of multiple servers or the like). Modulation oscillator 110 is also coupled via link 115 to a master clock 130. Master clock 130 generates a reference modulated spread-spectrum clock on a link 135 for other emission sources in the electronic system (e.g., other systems plugged in a back frame, other servers installed in a rack of servers or the like).

Figure 1B:
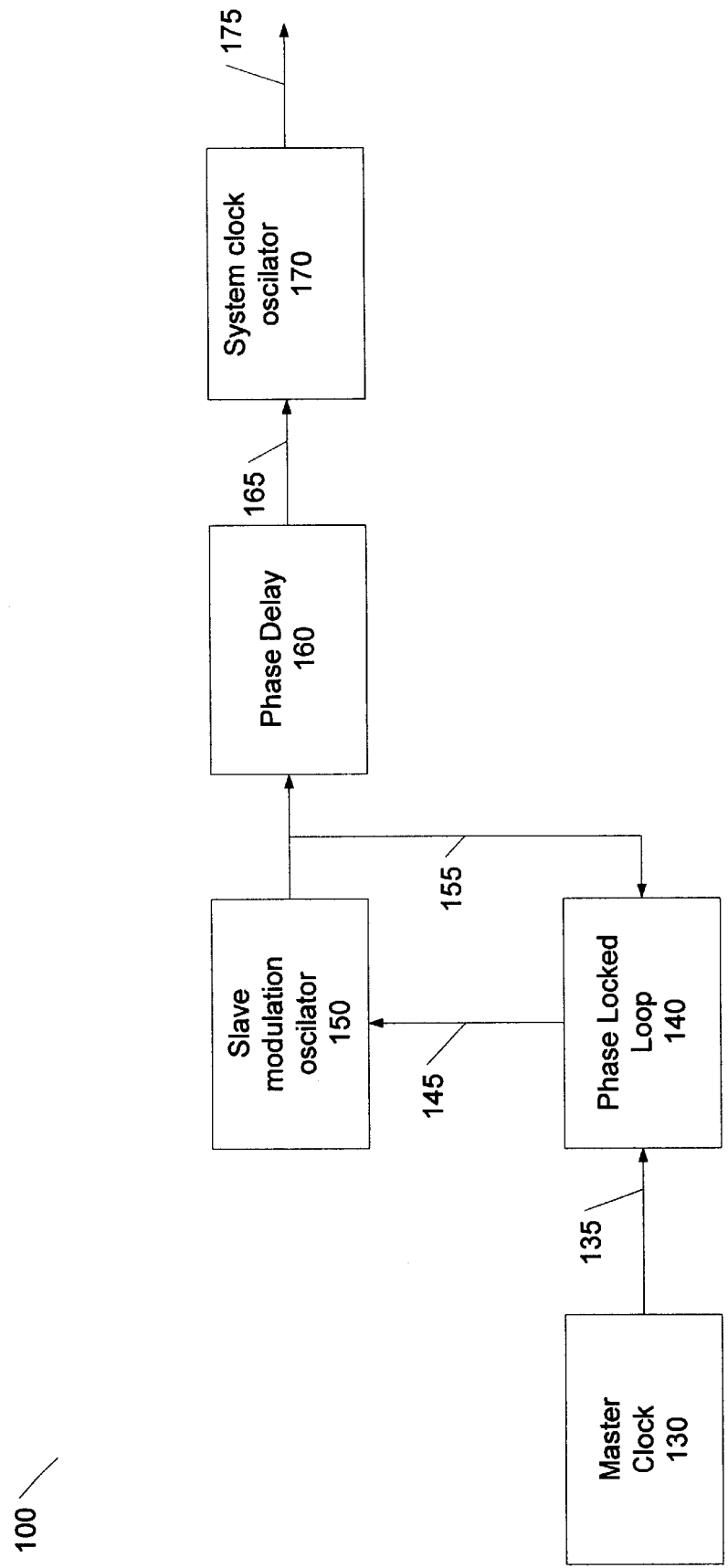
FIG. 1B illustrates an example of a slave spread-spectrum clock generation system according to an embodiment of the present invention.

FIG. 1B illustrates an example of a slave spread-spectrum clock generation system according to an embodiment of the present invention. Master clock 130 is coupled via link 135 to a phase-locked loop 140. Phase-locked loop 140 replicates the master clock for slave sources (e.g., servers, circuits or the like). Master clock 130 can be distributed to multiple slave sources. Phase-locked loop 140 is coupled via a link 145 to a Modulation oscillator 150. Modulation oscillator 150 is similar to modulation oscillator 110. Modulation oscillator 150 is coupled via a link 155 to a phase delay 160. Modulation oscillator 150 is also coupled to phase-locked loop 140 via link 155. Phase delay 160 can be any delay technique (e.g., predetermined hardware circuit delay, software programmed dynamically adjusted delay or the like) that is used to generate phase delay of a signal. Phase delay 160 is coupled via a link 165 to a system clock oscillator 170.

System clock oscillator 170 can be any clock generator for the slave system. System clock oscillator 170 provides phased delayed spread-spectrum clocking to the slave system on a link 175. The slave spread-spectrum clock generation system depicted in FIG. 1B can be used to provide slave system clock for each slave source in the system. The slave system clock can be generated directly from the master clock in parallel using different phase shifts (e.g., each slave clock generation having different phase shift or the like) or the slave clock can be generated in series from previous slave clock using similar phase shift (e.g., same phase shift from previous slave clock or the like).

Functioning of Phase-Delayed Spread-Spectrum Clocking System

The spread-spectrum clock is used generate master reference clock for the master emission source in the system. The master source can be any source receiving the first spread-spectrum clock (e.g., first circuit card in a back plane, first server in a rack of server, or the like). The source receiving the first spread-spectrum clock can be determined based on the system configuration and clock needs. In one embodiment of the present invention, master spread-spectrum clock is used for the first server in a rack of servers. The modulated master clock is then provided to slave sources. A slave source can be any source receiving the spread-spectrum clock after the first clock is distributed to the master source (e.g., the first circuit board in a back plane or the like).

The slave source adjusts the phase of the spread-spectrum clock. The phase of the spread-spectrum clock can be determined based on the number of sources receiving the spread-spectrum clock. For example, if nine sources are coupled together then each source can delay the phase of the spread-spectrum clock by 40 degrees. Similarly, if 18 sources are coupled together, each source can delay the phase of the spread-spectrum clock by 20 degrees and so on. Generally, when the phase of the spread-spectrum clock remains the same throughout the systems, the spread-spectrum clock can cause the frequencies of multiple sources to overlap in the measured bandwidth of the EMI receiver. Thus, causing the system to generate EMI beyond compliance guidelines. By offsetting the phase of the spread-spectrum clock, the number of frequencies in the measured bandwidth of the EMI receiver can be minimized.

In spread-spectrum clocking, the clock of a source varies by a small amount (e.g., 0.25% to 5% or the like) around the nominal center frequency. The variation in the clock frequency allows the energy to be spread across a wider bandwidth then the bandwidth used by the EMI receiver (e.g., 120 KHz). The offset in the phase of the spread-spectrum clock for each source within a system further minimizes the number of clocks within the measuring bandwidth of the EMI receiver. In another embodiment, the phase shifted spread-spectrum clock for every slave source can be derived from the master spread-spectrum clock.

Figure 2:
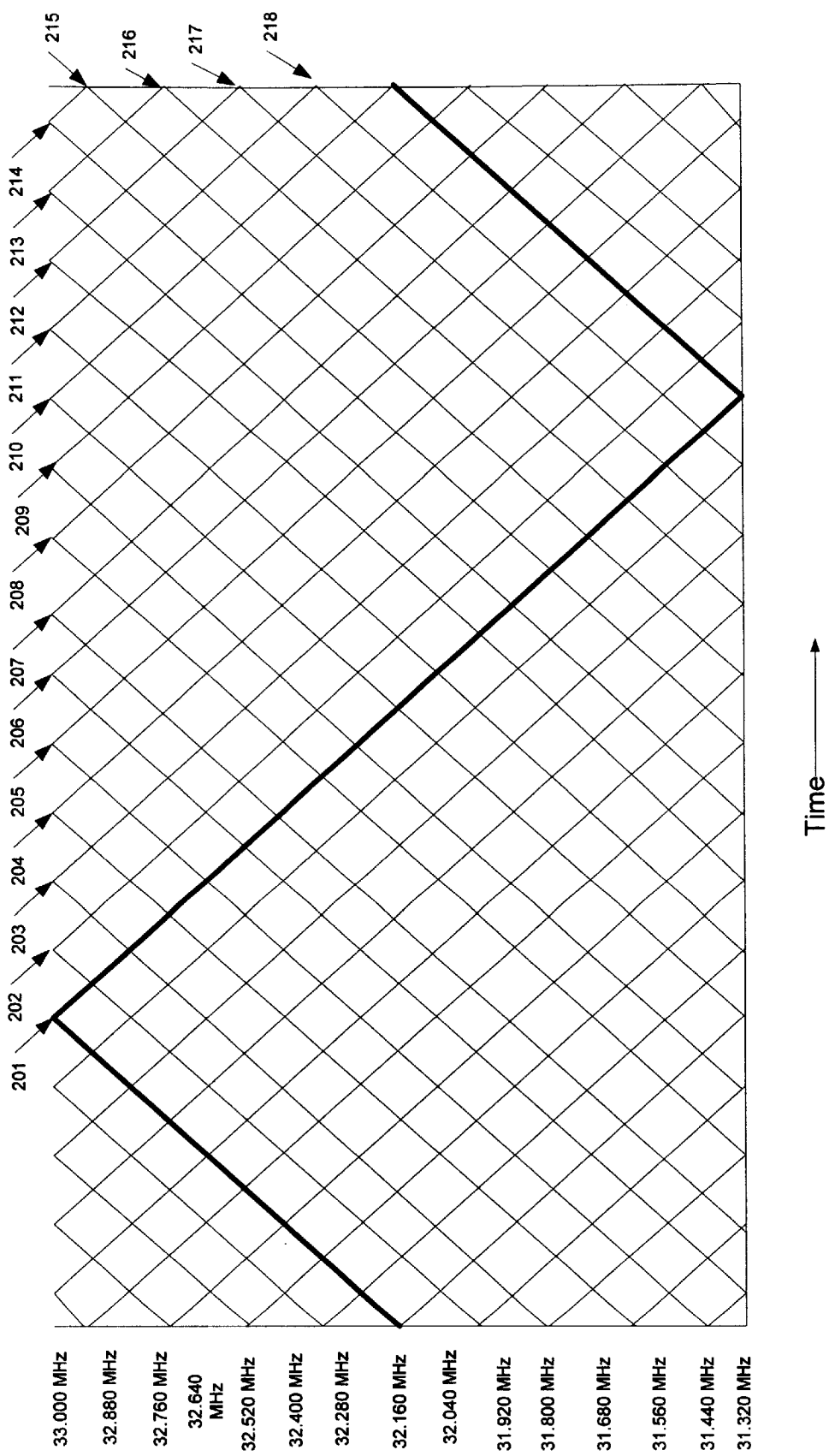
FIG. 2 illustrates an example of a phase-shifted triangular modulating wave according to an embodiment of the present invention.

FIG. 2 illustrates an example of a phase-shifted triangular modulating wave according to an embodiment of the present invention. For purposes of illustrations, in the present example, there are 18 sources in the system. Each source generates a spread-spectrum clock that with an offset. Clocks 201–218 are generated by the system. Each source can offset the clock by 20 degrees over a 360 degrees cycle. In the present example, clock 201 is the master referenced spread-spectrum clock that is used by the master source. Each additional source offsets the clock by a 20 degrees phase shift. The system can be designed to assign master clock to any of the source and remaining sources can be identified as slaves. In case of a failure of the master source, the system can be configured to dynamically allocate the master clock to any of the slave source.

The amount of offset in the master spread-spectrum clock can be predetermined based on the number of sources in a system or the system can be programmed (e.g., micro-controlled, application specific design or the like) to dynamically calculate the phase offset (e.g., based on the number of source or the like). In the present example, the system is being monitored using an EMI receiver with 120 KHz bandwidth. The amount of reduction in the measured EMI can be determined by following formula:

(Measured Frequency*Spread%)/(Measured bandwidth)=Reduction Ratio

Where measured frequency is the fundamental frequency measured, measured bandwidth is the bandwidth window used by the EMI receiver and the reduction ratio is the amount of reduction obtained by the phase offset. The number of clocks in the measured bandwidth are: (Number of sources/Reduction ratio)+1.

In the present example, measured frequency is 33 MHz, the clock spread is 5% (0.05), the measured bandwidth is 120 KHz and the reduction ratio is 13.75. For purposes of illustration, in the present example, 18 EMI sources are used, thus the number of clocks in the measured bandwidth are: (18/13.75)+1=2.31. Thus, at any instance during EMI measurement, a maximum of three clocks will be present. Because the clocks are spread across the spectrum, the maximum energy recorded by the EMI receiver at any given time can be the sum of three clock energies in a 18 source system. Similarly, various combinations of the sources and phase offset can be use depending upon the system configuration to minimize the number of clocks in the measured bandwidth of an EMI receiver.

Figure 3:
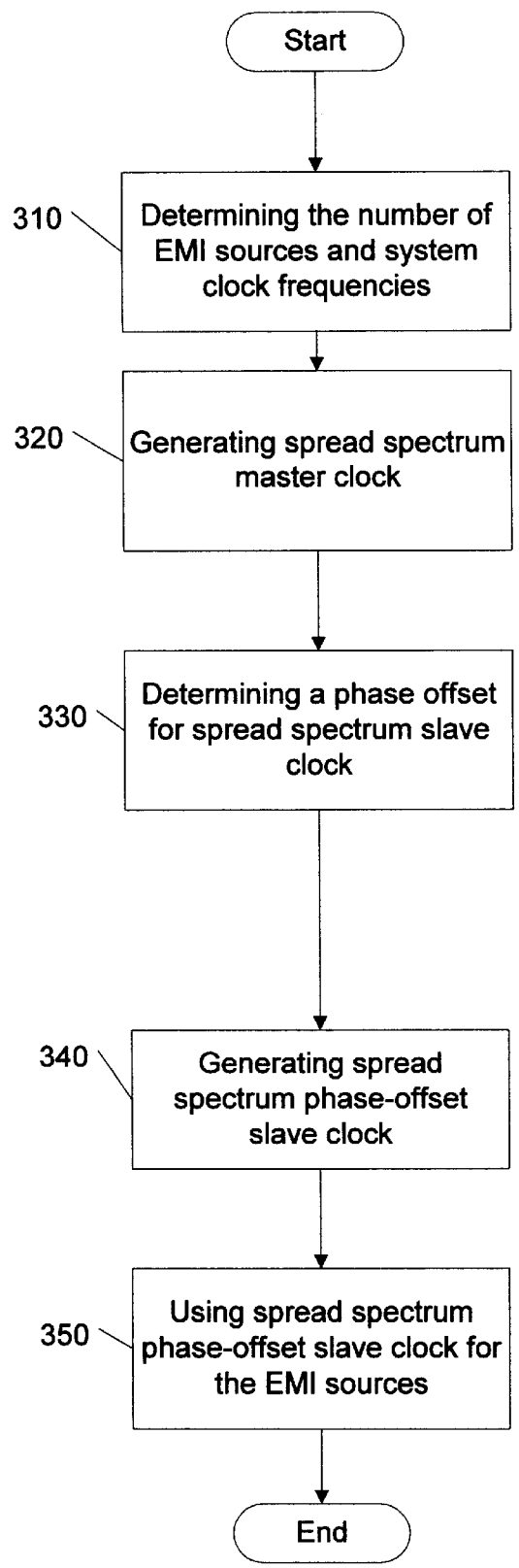
FIG. 3 illustrates an example of steps performed during the process of generating advanced spread spectrum clock for the reduction of EMI of multiple clock sources according to an embodiment of the present invention.

FIG. 3 illustrates an example of steps performed during the process of generating advanced spread spectrum clock for the reduction of EMI of multiple clock sources according to an embodiment of the present invention. Initially, the process determines the number of EMI sources and system clock frequencies (310). Next, the process generates spread spectrum master clock (320). The process then determines the phase offset for spread spectrum slave clock according to the number of EMI sources and the reduction ration desired (330). The phase offset can be predetermined or dynamically calculated by a system carrying EMI sources. The process then generates spread spectrum phase-offset slave clocks according to previously determined phase-shifts (340). The process then uses the spread spectrum phase-offset slave clocks for EMI sources in the system (350).

Information Handling System.

Figure 4:
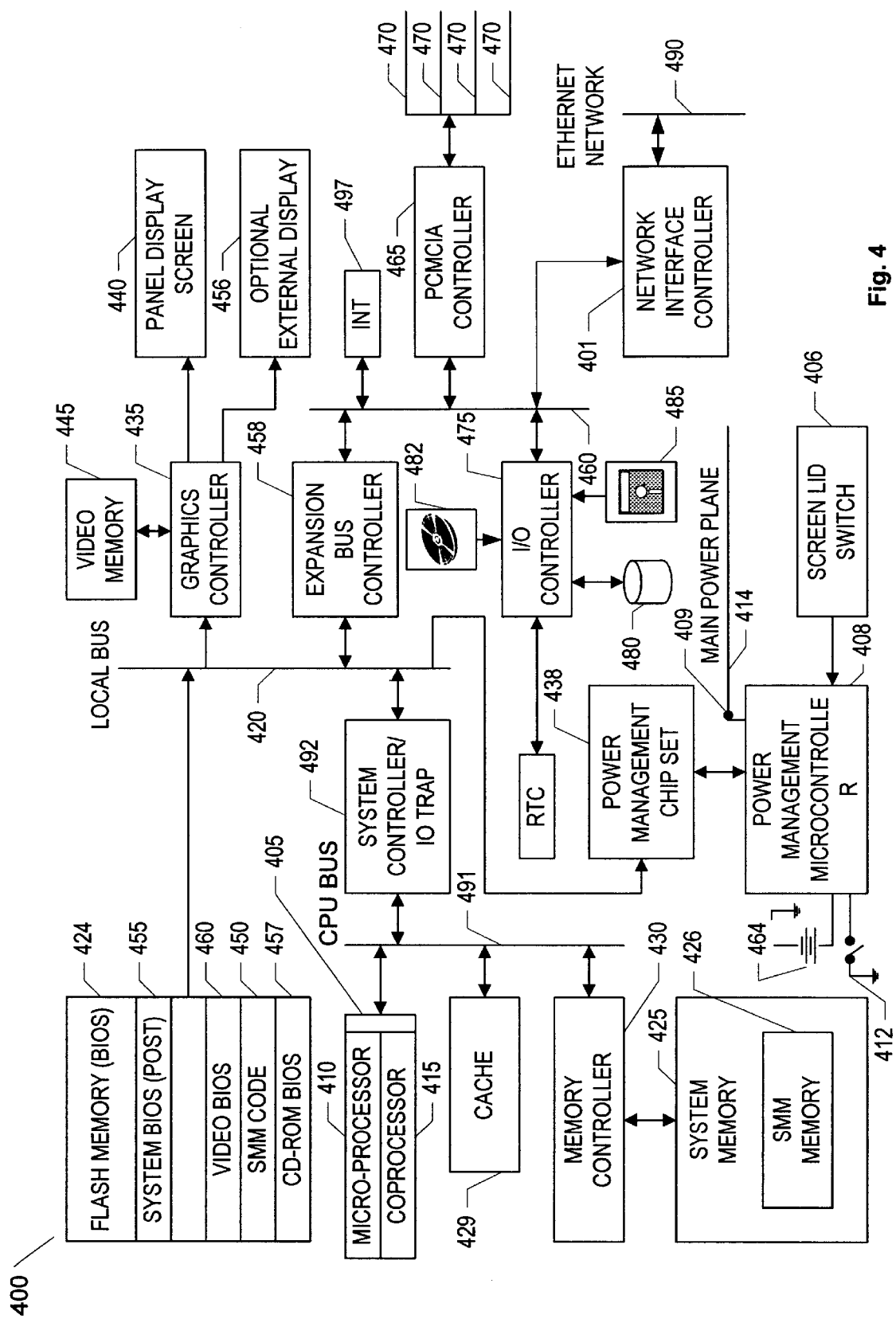
FIG. 4 illustrates an example of an information handling system that can be a source of EMI according to an embodiment of the present invention.

FIG. 4 illustrates an example of an information handling system 400 that can be a source of EMI according to an embodiment of the present invention. In one embodiment of the present invention, the information handling system 400 is a computer system. Information handling system 400 includes a processor 405, for example, an Intel Pentium™ class microprocessor. The processor 405 may include a central processing unit ("CPU") and a coprocessor 415 for handling floating point operations. Processor 405 is coupled to cache 429 and memory controller 430 via processor bus 491. System controller I/O trap 492 couples processor bus 491 to local bus 420 and is generally characterized as part of a system controller such as a Pico Power Vesuvious or an Intel™ Mobile Triton chip set. System controller I/O trap 492 can be programmed in a well-known manner to intercept a particular target address or address range, and, upon intercepting a target address, system controller I/O trap 492 asserts an intercept signal indicating that processor 405 attempted to access the target address.

A main memory 425 of dynamic random access memory ("DRAM") modules is coupled to local bus 420 by a memory controller 430. Main memory 425 includes a system management mode memory area which is employed to store converter code to implement conversion methodology embodiments as will be discussed in more detail subsequently. In its simplest form an information handling system may include the processor 405 and the memory 425. The processor 405 is typically enabled to execute instructions stored in the memory 425. The executed instructions typically perform a function. Information handling systems may vary in size, shape, performance, functionality and price. Examples of a information handling systems may include everything from a pager to a mainframe computer.

A (BIOS) memory 424 is coupled to local bus 420. A FLASH memory or other nonvolatile memory is used as BIOS memory 424. A BIOS program (not shown) is usually stored in the BIOS memory 424. The BIOS program includes software for interaction with the information handling system boot devices such as the keyboard, the mouse, or a CD-ROM 182. The BIOS memory 424 stores the system code which controls some information handling system 400 operations. A graphics controller 435 is coupled to local bus 420 and to a panel display screen 440. Graphics controller 435 is also coupled to a video memory 445 which stores information to be displayed on panel display 440. Panel display 440 is typically an active matrix or passive matrix liquid crystal display ("LCD") although other display technologies may be used as well. Graphics controller 435 can also be coupled to an optional external display or standalone monitor display 456 as shown in FIG. 5. One graphics controller that can be employed as graphics controller 435 is the Western Digital WD90C24A graphics controller.

A bus interface controller or expansion bus controller 458 couples local bus 420 to an expansion bus 460. In this particular embodiment, expansion bus 460 is an Industry Standard Architecture ("ISA") bus although other buses, for example, a Peripheral Component Interconnect ("PCI") bus, could also be used. A personal computer memory card international association ("PCMCIA") controller 465 is also coupled to expansion bus 460 as shown. PCMCIA controller 465 is coupled to a plurality of expansion slots 470 to receive PCMCIA expansion cards such as modems, fax cards, communications cards, and other input/output devices. Interrupt request generator 497 is also coupled to ISA bus 460 and issues an interrupt service request over a predetermined interrupt request line after receiving a request to issue interrupt instruction from processor 405.

An I/O controller 475, often referred to as a super I/O controller is coupled to ISA bus 460. I/O controller 475 interfaces to an integrated drive electronics ("IDE") hard drive 480, a CD-ROM drive 482 and a floppy drive 485. A network interface controller 401 enables the information handling system 400 to communicate with a computer network such as an Ethernet 490. The computer network may include a network such as a local area network ("LAN"), wide area network ("WAN"), Internet, Intranet, wireless broadband or the like. The network interface controller 401 forms a network interface for communicating with other information handling systems (not shown) connected to the Ethernet 490 for implementing a method of dynamically generating a unique computer name for each information handling system that is connected to the network of other information handling systems. The information handling system's networking components generally include hardware as well as software components. Examples of the hardware components include the network interface controller 401 and the Ethernet 490. Examples of the software components, which include messaging services and network administration services, are described below.

The information handling system 400 serves as a controller for resolving proprietary and standard event and message structures into a common format for use by the computer network for many management purposes. The information handling system 400 is connected with a plurality of computer systems in the network for receiving messages from the computer systems, analyzing the messages and determine an effective utilization of the messages as directed by a user or network administrator. The information handling system 400 receives messages in different message formats, organizes the messages, and converts the messages into a common format that assists a user, system administrator, or network administrator in utilizing the information contained in the messages. The converted messages in a common format are distributed at the discretion of a user, network administrator, or system administrator based on user needs or message importance to other system administration applications via a selected communication method. The network administrator controls the type of messages that are communicated over the network. The information handling system 400 supports the conversion of messages into the common format to facilitate particular network applications.

Information handling system 400 includes a power supply 464, for example, a battery, which provides power to the many devices which form information handling system 400. Power supply 464 is typically a rechargeable battery, such as a nickel metal hydride ("NiMH") or lithium ion battery, when information handling system 400 is embodied as a portable or notebook computer. Power supply 464 is coupled to a power management microcontroller 408 which controls the distribution of power from power supply 464. More specifically, microcontroller 408 includes a power output 409 coupled to the main power plane 414 which supplies power to processor 405. Power microcontroller 408 is also coupled to a power plane (not shown) which supplies power to panel display 440. In this particular embodiment, power control microcontroller 408 is a Motorola 6805 microcontroller. Microcontroller 408 monitors the charge level of power supply 464 to determine when to charge and when not to charge battery 464. Microcontroller 408 is coupled to a main power switch 412 which the user actuates to turn the information handling system 400 on and off. While microcontroller 408 powers down other portions of information handling system 400 such as hard drive 480 when not in use to conserve power, microcontroller 408 itself is always coupled to a source of energy, namely power supply 464.

The information handling system 400 may be configured as a server. The information handling system 400, in a sever embodiment, provides a service to other information handling systems connected to it via a network, e.g., Ethernet 490. In a portable embodiment, information handling system 400 also includes a screen lid switch 406 or indicator 406 which provides an indication of when panel display 440 is in the open position and an indication of when panel display 440 is in the closed position. It is noted that panel display 440 is generally located in the same location in the lid of the computer as is typical for "clamshell" types of portable computers such as laptop or notebook computers. In this manner, the display screen forms an integral part of the lid of the computer which swings from an open position for interaction with the user to a close position.

Information handling system 400 also includes a power management chip set 438, which includes power management chip models PT86C521 and PT86C522 manufactured by Pico Power. Power management chip set 438 is coupled to processor 405 via local bus 420 so that power management chip set 438 can receive power control commands from processor 405. Power management chip set 438 is connected to a plurality of individual power planes which supply power to respective devices in information handling system 400 such as hard drive 480 and floppy drive 485, for example. In this manner, power management chip set 438 acts under the direction of processor 405 to control the power to the various power planes and devices of the computer. A real time clock ("RTC") 440 is coupled to I/O controller 475 and power management chip set 438 such that time events or alarms can be transmitted to power management chip set 438. Real time clock 440 can be programmed to generate an alarm signal at a predetermined time.

When information handling system 400 is turned on or powered up, the information handling system 400 enters a start up phase, also referred to as a boot up phase, during which the information handling system hardware is detected and the operating system is loaded. In case of a information handling system 400 with the Windows NT operating system, the boot up process is typically divided into three stages. The initial two boot stages pertain to start up of the system components of the information handling system 400 and the 3rd stage typically pertains to the boot up of networking components of the information handling system 400.

During the initial two boot stages, the information handling system BIOS software stored in non-volatile BIOS memory 424 is copied into main memory 425 so that it can be executed more quickly. This technique is referred to as "shadowing" or "shadow RAM" as discussed above. At this time, system management mode ("SMM") code 450 is also copied into the system management mode memory area 426 of main memory 425. Processor 405 executes SMM code 450 after processor 405 receives a system management interrupt ("SMI") which causes the microprocessor to enter SMM. Additional conditions under which an SMI is generated are discussed subsequently. It is noted that along with SMM code 450, also stored in BIOS memory 424 and copied into main memory 425 at power up are system BIOS 455 (including a power on self test module-POST), network BIOS 457 and video BIOS 460. It will be recognized by those of ordinary skill in the art that other memory mapping schemes may be used. For example, SMM code 450 may be stored in fast SRAM memory (not shown) coupled to the local/processor bus 420.

The system BIOS 455 includes BIOS software configurable to load and perform a method of dynamically generating a unique computer name for each information handling system that is connected to a network of information handling systems as described in further detail below. The network boot up process typically pertains to connecting the information handling system 400 to a computer network such as an Ethernet 490. During the network boot process, which is typically the final stage of the boot up, the network BIOS 457 is configurable to load and execute the networking components.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of reducing electromagnetic interference in a system comprising:
    generating a spread-spectrum master clock;
    dynamically calculating a plurality of phase delays;
    generating a plurality of phase-offset spread-spectrum slave clocks from said spread-spectrum master clock, the clocks having the dynamically calculated phase delays; and
    using said plurality of phase-offset spread-spectrum slave clocks for a plurality of electromagnetic interference sources.

2. The method of claim 1, wherein each one of said plurality of phase-offset spread-spectrum slave clocks has a different phase-offset.

3. The method of claim 1, wherein said different phase-offset is generated using a plurality of phase delays.

4. The method of claim 1, wherein said plurality of phase delays is predetermined.

5. The method of claim 1, wherein dynamically calculating a plurality of phase delays further comprises:
    determining the number of electromagnetic sources; and
    calculating a substantially equal phase delay for each electromagnetic source.

6. The method of claim 1, wherein said plurality of phase-offset spread-spectrum slave clocks are generated serially from said spread-spectrum master clock.

7. The method of claim 1, wherein said plurality of phase-offset spread-spectrum slave clocks are generated in parallel from said spread-spectrum master clock.

8. A system for reducing electromagnetic interference comprising:
    a spread-spectrum clock generator, said spread-spectrum clock generator generates a spread-spectrum master clock; and
    a phase delay unit coupled to said spread-spectrum clock generator, said phase delay unit provides a dynamically determined phase delay for said spread-spectrum master clock.

9. The system of claim 8, further comprising:
    a phase-locked loop unit, said phase-locked loop unit replicates said spread-spectrum master clock; and
    a modulation oscillator coupled to said phase delay unit, said modulation oscillator regenerates said spread-spectrum master clock.

10. The system of claim 8, further comprising:
    a system clock oscillator coupled to said phase delay unit, said system clock oscillator generates at least one phase-delayed spread-spectrum slave clock.

11. The system of claim 8, wherein said phase delay is predetermined.

12. The system of claim 8, wherein said phase delay is dynamically determined so that each of plural electromagnetic interference sources receives a clock signal having a phase with substantially even spacing from other clock signals.

13. A system for reducing electromagnetic interference comprising:

means for generating a spread-spectrum master clock;

means for generating a dynamically-calculated plurality of phase-offset spread-spectrum slave clocks from said spread-spectrum master clock; and means for using said plurality of phase-offset spread-spectrum slave clocks for a plurality of electromagnetic interference sources.

14. The system of claim 13, wherein each one of said plurality of phase-offset spread-spectrum slave clocks has a different phase-offset.

15. The system of claim 13, wherein said different phase-offset is generated using a plurality of phase delays.

16. The system of claim 13, wherein said plurality of phase delays is predetermined.

17. An information handling system comprising:

a processor;

a system bus;

a memory coupled to said processor via said system bus, said processor is configured to generate a spread-spectrum master clock;

generate a plurality of spread-spectrum slave clocks from said spread-spectrum master clock, the spread-spectrum slave clocks having substantially evenly spaced phases; and use said plurality of phase-offset spread-spectrum slave clocks for a plurality of electromagnetic interference sources.

18. The information handling system of claim 17, wherein each one of said plurality of phase-offset spread-spectrum slave clocks has a different phase-offset.

19. The information handling system of claim 17, wherein said different phase-offset is generated using a plurality of phase delays.

20. The information handling system of claim 17, wherein said plurality of phase delays is predetermined.

21. The information handling system of claim 17, wherein said plurality of phase delays is dynamically calculated by dividing a frequency cycle by the number of electromagnetic sources.

* * * * *